US012596557B2

(12) United States Patent
Abbas et al.

(10) Patent No.: US 12,596,557 B2
(45) Date of Patent: Apr. 7, 2026

(54) SYSTEM AND METHOD FOR GENERATING RECOMMENDATIONS FOR DATA TAGS

(71) Applicant: The Toronto-Dominion Bank, Toronto (CA)

(72) Inventors: Mohamed Abbas, Jersey City, NJ (US); Robert Setlight, Robbinsville, NJ (US); Richard Bruce Johnson, Cape Elizabeth, ME (US); Levi Sutter, Westamptom, NJ (US); Pooja Abhishek Daryani, Fremont, CA (US)

(73) Assignee: The Toronto-Dominion Bank, Toronto (CA)

( * ) Notice: Subject to any disclaimer, the term of this patent is extended or adjusted under 35 U.S.C. 154(b) by 228 days.

(21) Appl. No.: 18/502,318

(22) Filed: Nov. 6, 2023

(65) Prior Publication Data

US 2025/0147733 A1     May 8, 2025

(51) Int. Cl.
*G06F 9/445*       (2018.01)
*G06F 8/20*        (2018.01)
(Continued)

(52) U.S. Cl.
CPC ............ *G06F 9/44526* (2013.01); *G06F 8/20* (2013.01); *G06F 8/38* (2013.01); *G06F 11/3636* (2013.01);
(Continued)

(58) Field of Classification Search
CPC .... G06F 40/137; G06F 40/14; G06F 9/44526; G06F 11/3636; G06K 7/1443; H04L 51/224; G06N 20/00
See application file for complete search history.

(56) References Cited

U.S. PATENT DOCUMENTS 6,596,031 B1 * 7/2003 Parks .................... G06F 40/137
                                                  715/239
10,783,405 B2 9/2020 Rohde et al.
(Continued)

FOREIGN PATENT DOCUMENTS

IN      202141058057 A    4/2022
WO      2022093690 A1     5/2022

OTHER PUBLICATIONS

Zhu et al, CN 108228873 (translation), Feb. 18, 2022, 28 pgs <CN_108228873.pdf>.*
(Continued)

*Primary Examiner* — Tuan A Vu
(74) *Attorney, Agent, or Firm* — Rowand LLP

(57) ABSTRACT

A server computer system comprises a communications module; at least one processor coupled with the communications module; and a memory coupled to the processor and storing processor-executable instructions which, when executed by the at least one processor, configure the at least one processor to provide a plug-in to an interface design software application executing on a computing device, the plug-in allowing the server computer system to communicate with the computing device to monitor design of an interface within the interface design software application; generate at least one recommendation for tagging at least one element of the interface; and send, for display on a display screen of the computing device within the interface design software application, the at least one recommendation for tagging the at least one element. The system may include a generative artificial intelligence module trained to generate the at least one recommendation.

20 Claims, 7 Drawing Sheets

(51) Int. Cl.

| | |
|---|---|
| *G06F 8/38* | (2018.01) |
| *G06F 11/362* | (2025.01) |
| *G06N 3/0455* | (2023.01) |
| *G06N 3/0475* | (2023.01) |
| *G06N 3/094* | (2023.01) |
| *G06F 40/137* | (2020.01) |
| *G06F 40/14* | (2020.01) |
| *G06F 40/169* | (2020.01) |
| *G06K 7/14* | (2006.01) |
| *H04L 51/224* | (2022.01) |

(52) U.S. Cl.

CPC ......... *G06N 3/0455* (2023.01); *G06N 3/0475* (2023.01); *G06N 3/094* (2023.01); *G06F 40/137* (2020.01); *G06F 40/14* (2020.01); *G06F 40/169* (2020.01); *G06K 7/1443* (2013.01); *H04L 51/224* (2022.05)

(56) References Cited

U.S. PATENT DOCUMENTS

| | | | | |
|---|---|---|---|---|
| 11,042,692 | B1 * | 6/2021 | Greisen ................... | G06F 40/14 |
| 11,650,717 | B2 | 5/2023 | Liu et al. | |
| 11,727,084 | B1 | 8/2023 | Lonsdorf et al. | |
| 11,836,570 | B1 * | 12/2023 | Claeys ................. | G06K 7/1443 |
| 2012/0030553 | A1 * | 2/2012 | Delpha ................. | G06F 40/169 |
| | | | | 715/205 |
| 2023/0066403 | A1 * | 3/2023 | Matsuoka ............. | H04L 51/224 |
| 2023/0236849 | A1 | 7/2023 | Kumar et al. | |
| 2023/0245150 | A1 | 8/2023 | Von Stackelberg et al. | |
| 2024/0320476 | A1 * | 9/2024 | Chandrasekaran .... | G06N 20/00 |

OTHER PUBLICATIONS

Chen Dan, CN 113205314, (translation), Aug. 3, 2021, 11 pgs <CN_113205314.pdf>.*

* cited by examiner

100

400

Obtain a set of interfaces generated in accordance with an entity defined format from a database

410

Create training data based at least on the set of interfaces generated in accordance with the entity defined format

420

Train the generative artificial intelligence module using the training data

430

500

Monitor design of an interface within the interface design software application

510

Generate at least one recommendation for tagging at least one element of the interface

520

Send, for display on a display screen of the computing device within the interface design software application, the at least one recommendation for tagging the at least one element

530

600

Receive, from the computing device, an indication of acceptance of the at least one recommendation

610

Complete the tagging of the at least one element in accordance with the at least one recommendation

620

SYSTEM AND METHOD FOR GENERATING RECOMMENDATIONS FOR DATA TAGS

TECHNICAL FIELD

The present application relates to systems and methods for generating recommendations for data tags.

BACKGROUND

Data planning and tagging are important processes when creating or designing interfaces. For example, tagging ensures that data is structured, labelled and utilized in a way that enhances the usability and functionality of the interface.

It is often difficult and time consuming to manage data planning and tagging.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
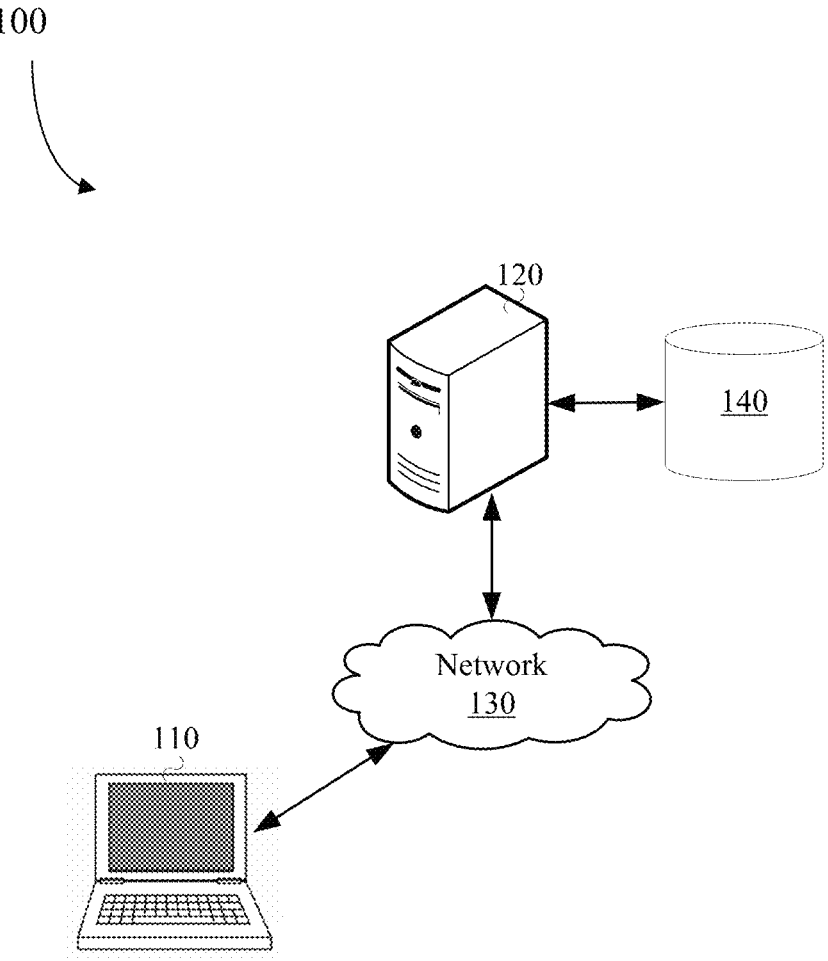
FIG. 1 is a schematic operation diagram illustrating an operating environment of an example embodiment.

Accordingly, in one aspect there is provided a server computer system comprising a communications module; at least one processor coupled with the communications module; and a memory coupled to the processor and storing processor-executable instructions which, when executed by the at least one processor, configure the at least one processor to provide a plug-in to an interface design software application executing on a computing device, the plug-in allowing the server computer system to communicate with the computing device to monitor design of an interface within the interface design software application; generate at least one recommendation for tagging at least one element of the interface; and send, for display on a display screen of the computing device within the interface design software application, the at least one recommendation for tagging the at least one element.

In one or more embodiments, the at least one recommendation for tagging the at least one element includes a recommendation to tag the at least one element in accordance with an entity defined format.

In one or more embodiments, the server computer system comprises a generative artificial intelligence module trained to generate the at least one recommendation.

In one or more embodiments, the processor-executable instructions, when executed by the at least one processor, configure the at least one processor to obtain a set of interfaces generated in accordance with an entity defined format from a database; create training data based at least on the set of interfaces generated in accordance with the entity defined format; and train the generative artificial intelligence module using the training data.

In one or more embodiments, the processor-executable instructions, when executed by the at least one processor, configure the at least one processor to receive, from the computing device, an indication of acceptance of the at least one recommendation; and responsive to receiving the indication of the acceptance of the at least one recommendation, complete the tagging of the at least one element in accordance with the at least one recommendation.

In one or more embodiments, completing the tagging of the at least one element includes generating metadata associated with the at least one element.

In one or more embodiments, the at least one recommendation for tagging the at least one element is displayed adjacent to the at least one element on the display screen of the computing device.

In one or more embodiments, the at least one recommendation for tagging the at least one element includes a recommendation for a particular tag that defines a trigger for executing program code of the particular tag.

In one or more embodiments, the processor-executable instructions, when executed by the at least one processor, configure the at least one processor to identify at least one other element of the interface that includes a tag; and generate the at least one recommendation for tagging the at least one element based on the tag of the at least one other element.

In one or more embodiments, the processor-executable instructions, when executed by the at least one processor, configure the at least one processor to generate at least one recommendation for adding additional elements to the interface.

According to another aspect there is provided a computer-implemented method comprising providing a plug-in to an interface design software application executing on a computing device, the plug-in allowing a server computer system to communicate with the computing device to perform monitoring design of an interface within the interface design software application; generating at least one recommendation for tagging at least one element of the interface; and sending, for display on a display screen of the computing device within the interface design software application, the at least one recommendation for tagging the at least one element.

In one or more embodiments, the at least one recommendation for tagging the at least one element includes a recommendation to tag the at least one element in accordance with an entity defined format.

In one or more embodiments, the method further comprises providing a generative artificial intelligence module to generate the at least one recommendation.

In one or more embodiments, the method further comprises obtaining a set of interfaces generated in accordance with an entity defined format from a database; creating training data based at least on the set of interfaces generated in accordance with the entity defined format; and training the generative artificial intelligence module using the training data.

In one or more embodiments, the method further comprises receiving, from the computing device, an indication of acceptance of the at least one recommendation; and responsive to receiving the indication of the acceptance of the at least one recommendation, completing the tagging of the at least one element in accordance with the at least one recommendation.

In one or more embodiments, completing the tagging of the at least one element includes generating metadata associated with the at least one element.

In one or more embodiments, the at least one recommendation for tagging the at least one element is displayed adjacent to the at least one element on the display screen of the computing device.

In one or more embodiments, the at least one recommendation for tagging the at least one element includes a recommendation for a particular tag that defines a trigger for executing program code of the particular tag.

In one or more embodiments, the method further comprises identifying at least one other element of the interface that includes a tag; and generating the at least one recommendation for tagging the at least one element based on the tag of the at least one other element.

According to another aspect there is provided a non-transitory computer readable storage medium comprising computer-executable instructions which, when executed, configure at least one processor to provide a plug-in to an interface design software application executing on a computing device, the plug-in allowing a server computer system to communicate with the computing device to monitor design of an interface within the interface design software application; generate at least one recommendation for tagging at least one element of the interface; and send, for display on a display screen of the computing device within the interface design software application, the at least one recommendation for tagging the at least one element.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment. As shown, the system 100 includes a computing device 110 and a server computer system 120 coupled to one another through a network 130, which may include a public network such as the Internet and/or a private network. The computing device 110 and the server computer system 120 may be in geographically disparate locations. Put differently, the computing device 110 and the server computer system 120 may be located remote from one another.

The server computer system 120 is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, computer servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The computing device 110 may be a laptop computer as shown in FIG. 1. However, the computing device 110 may be a computing device of another type such as for example a personal computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

As will be described in more detail below, the server computer system 120 may provide a plug-in to the computing device 110. Once installed on the computing device 110, the plug-in may enable or allow the server computer system 120 to communicate with the computing device 110.

In one or more embodiments, the plug-in is a software component that adds specific features to an interface design software application executing or resident on the computing device 110. As will be described in more detail below, the plug-in may monitor design of an interface within the interface design software application and may generate recommendations therefor.

In one or more embodiments, the plug-in provided by the server computer system 120 may include a generative artificial intelligence module that may be trained to generate the recommendations.

In one or more embodiments, the server computer system 120 may be associated with or may communicate with a database 140. The database 140 may store data that may be used to generate training data for training the artificial intelligence module. The data may include a plurality of interfaces previously created or designed for a particular entity.

Figure 2:
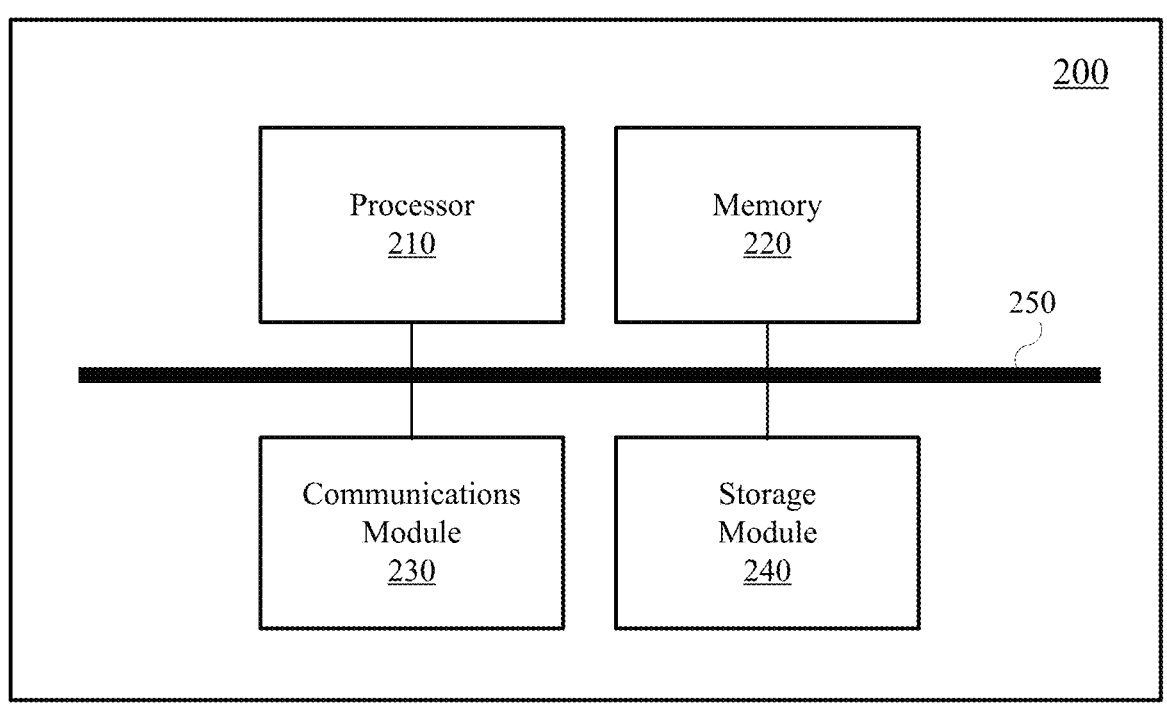
FIG. 2 is a high-level schematic diagram of an example computing device.

FIG. 2 is a high-level schematic diagram of a computer system 200. The computer system 200 may be any one of the computing device 110 and/or the server computer system 120.

The computer system 200 includes a variety of modules. For example, as illustrated, the computer system 200 may include a processor 210, a memory 220, a communications module 230, and/or a storage module 240. Further, while not illustrated in FIG. 2, the computer system 200 may include an I/O module. As illustrated, the foregoing example modules of the computer system 200 are in communication over a bus 250. As such, the bus 250 may be considered to couple the various modules of the computer system 200 to each other, including, for example, to the processor 210.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the computer system 200.

The communications module 230 allows the computer system 200 to communicate with other computing devices and/or various communications networks such as, for example, the network 130. For example, the communications module 230 may allow the computer system 200 to send or receive communications signals. Communications signals may be sent or received according to one or more protocols or according to one or more standards. The communications module 230 may allow the computer system 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the computer system 200 to communicate using near-field communication (NFC), via Wi-Fi™, using Bluetooth™ or via some combination of one or more networks or protocols. In some embodiments, all or a portion of the communications module 230 may be integrated into a component of the computer system 200. For example, the communications module 230 may be integrated into a communications chipset.

The I/O module is an input/output module. The I/O module allows the computer system 200 to receive input from and/or to provide input to components of the computer system 200 such as, for example, various input modules and output modules. For example, the I/O module may, as shown, allow the computer system 200 to receive input from and/or provide output to a display.

The storage module 240 allows data to be stored and retrieved. In some embodiments, the storage module 240 may be formed as a part of the memory 220 and/or may be used to access all or a portion of the memory 220. Additionally or alternatively, the storage module 240 may be used to store and retrieve data from persisted storage other than the persisted storage (if any) accessible via the memory 220. In some embodiments, the storage module 240 may be used to store and retrieve data in/from a database, such as the database 140 of FIG. 1 when the computer system is operating as the server computer system 120 of FIG. 1. A database may be stored in persisted storage. Additionally or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
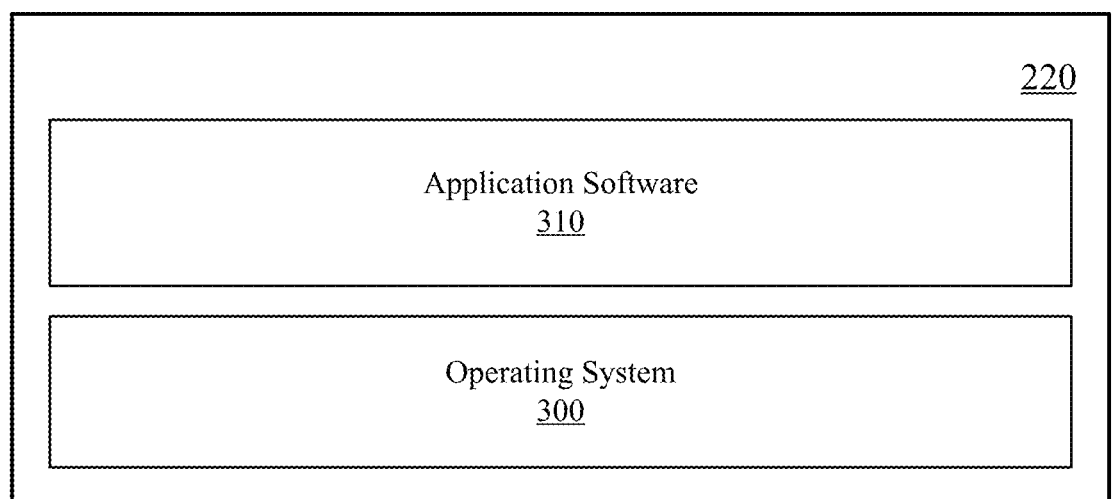
FIG. 3 shows a simplified organization of software components stored in a memory of the example computing device of FIG. 2.

FIG. 3 depicts a simplified organization of software components stored in the memory 220 of the computer system 200. As illustrated, these software components include an operating system 300 and an application software 310.

The operating system 300 is software. The operating system 300 allows the application software 310 to access the processor 210 (FIG. 2), the memory 220, the communications module 230, the I/O module, and the storage module 240 of the computer system 200. The operating system 300 may be, for example, Google™ Android™, Apple™ iOS™, UNIX™, Linux™, Microsoft™ Windows™, Apple OSX™ or the like.

The application software 310 adapts the computer system 200, in combination with the operating system 300, to operate as a device for performing a specific function. For example, in at least some embodiments in which the computer system 200 functions as the computing device 110, the applications 310 may include a web browser, which may also be referred to as an Internet browser. In at least some such embodiments, the server computer system 120 may provide a plug-in to the computing device 110. Once installed on the computing device 110, the plug-in enables or allows the server computer system 120 to communicate with the computing device 110.

In one or more embodiments, the plug-in is a software component that adds specific features to an interface design software application executing or resident on the computing device 110. As will be described in more detail below, the plug-in may monitor design of an interface within the interface design software application and may communicate recommendations thereto.

In one or more embodiments, the plug-in provided by the server computer system 120 may include a generative artificial intelligence module that may be trained to generate the recommendations. For example, as mentioned, the server computer system 120 may be associated with or may communicate with the database 140. The database 140 may store data that may be used to generate training data for training the artificial intelligence module. The data may include a plurality of interfaces previously created or designed for a particular entity.

Figure 4:
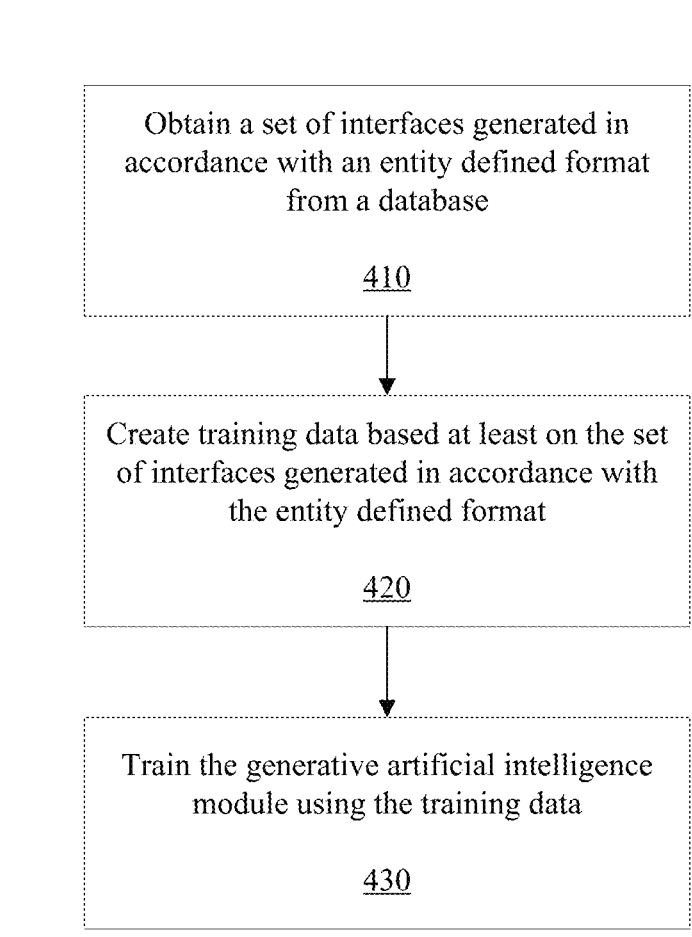
FIG. 4 is a flowchart showing operations performed by a server in training a generative artificial intelligence module according to an embodiment.

Reference is made to FIG. 4, which illustrates, in flowchart form, a method 400 for training the artificial intelligence module. The method 400 may be implemented by a computing device having suitable processor-executable instructions for causing the computing device to carry out the described operations. The method 400 may be implemented, in whole or in part, by the server computer system 120.

The method 400 includes obtaining a set of interfaces generated in accordance with an entity defined format (step 410).

In one or more embodiments, the interfaces may be obtained from the database associated with the server computer system 120. The interfaces may include a number of interfaces previously designed and stored in the database.

In one or more embodiments, the server computer system 120 may be associated with an entity. The entity may have defined one or more formats that were used to generate the interfaces stored in the database. The entity defined format may include one or more data tagging formats and/or one or more data planning formats. For example, at least some of the interfaces may have been generated such that an entity defined data tagging format was used to tag the interface elements thereon. In one or more embodiments, the data tagging may be stored as metadata.

The method 400 includes creating training data based at least on the set of interfaces generated in accordance with the entity defined format (step 420).

The training data may be generated based at least on the set of interfaces. For example, the training data may be generated using the metadata of each interface from the set of interfaces. It will be appreciated that in one or more embodiments, only a portion of the interfaces may be used as training data. For example, the database may store a number of different types of interfaces. Only one of the types of interfaces may have been generated using the entity defined format and as such only this type of interface may be used as the training data. This may be done to ensure that the artificial intelligence module is trained using only the types of interfaces that were generated according to the entity defined format.

It will be appreciated that the training data may include tag management plans and design elements.

The method 400 includes training the generative artificial intelligence module using the training data (step 430).

The training data is provided as input to train the generative artificial intelligence module. Generally, the generative artificial intelligence module learns from the training data. The training may include an iterative process that involves presenting the training data to the generative artificial intelligence module, adjusting one or more parameters, and continuously fine-tuning.

In one or more embodiments, the generative artificial intelligence module may be trained using a generative adversarial network (GAN). The GAN may utilize two neural networks, a generator network and a discriminator network, that contest with each other in the form of a zero-sum game. The generator network may be, for example, a neural network that may include any suitable number of layers and weights connected in any suitable manner. The discriminator network may be, for example, a convolutional neural network with any suitable number of layers and weights connected in any suitable manner. The GAN may learn to generate new data with the same statistics as the training data. For example, the artificial intelligence module may be trained, using the GAN, to generate data tags based on the training data.

In one or more embodiments, the generative artificial intelligence module may additionally or alternatively be trained using other machine learning techniques and reinforcement learning techniques.

The trained generative artificial intelligence module may be used to generate recommendations for data tags and/or data plans and this may be in accordance with the entity defined format that was used to generate the interfaces of the training data.

As mentioned, in one or more embodiments, the server computer system 120 may provide a plug-in that is a software component that adds specific features to an interface design software application executing or resident on the computing device 110. The interface design software application may be an online or web application or may be a desktop application. The interface design software application may be, for example, Figma™, Sketch™ and/or Adobe™ XD. The plug-in itself may include an input directory that may be associated with tag management software tools such as for example mParticle™, Google™ Tag Manager, Adobe™ Launch, etc. It will be appreciated that an operator of the computing device 110 may define or select which input directory is to be used and this may be done during a configuration process after the plug-in has been installed on the computing device 110.

The plug-in may allow the server computer system 120 to communicate with the computing device 110 and this may enable the server computer system 120 to monitor the design of an interface within the interface design software application. The server computer system 120 may generate recommendations for data tags.

Figure 5:
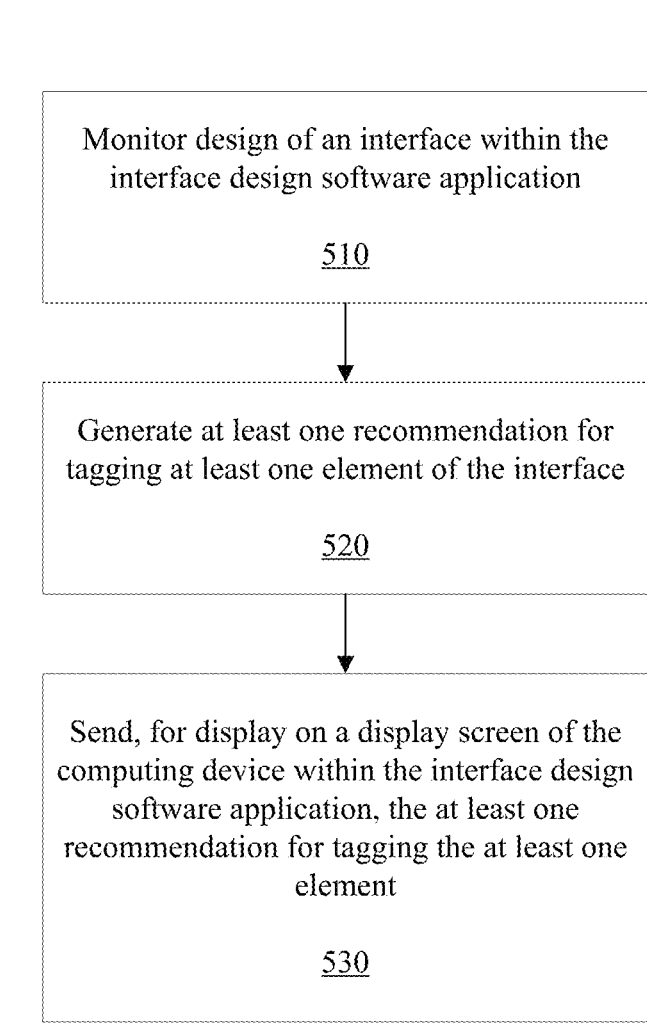
FIG. 5 is a flowchart showing operations performed by a server in generating recommendations for data tags according to an embodiment.

Reference is made to FIG. 5, which illustrates, in flow-chart form, a method 500 for generating recommendations data tags. The method 500 may be implemented by a computing device having suitable processor-executable instructions for causing the computing device to carry out the described operations. The method 500 may be implemented, in whole or in part, by the server computer system 120.

The method 500 includes monitoring design of an interface within the interface design software application (step 510).

As mentioned, the plug-in allows the server computer system 120 to communicate with the computing device 110. The plug-in may monitor the design of an interface within the interface design software application. For example, the plug-in may be activated when the interface design software application is opened up on the computing device 110. Once activated, the plug-in may monitor and track operations performed within the interface design software application.

During the design of the interface, an operator of the computing device 110 may add elements to the interface. The elements may include input controls, navigational components, informational components, containers, etc. For example, the elements may include one or more of buttons, widgets, input fields, etc.

The method 500 includes generating at least one recommendation for tagging at least one element of the interface (step 520).

In one or more embodiments, when a new element is added to the interface, the server computer system 120 may perform operations to generate at least one recommendation for tagging the at least one element. In one or more additional or alternative embodiments, the server computer system 120 may perform operations to generate the at least one recommendation for tagging the at least one element every time the interface is saved. For example, the operator of the computing device 110 may select a selectable option to "save" the interface and this may trigger the server computer system 120 to begin generating the at least one recommendation.

In one or more embodiments, the at least one recommendation for tagging the at least one element may include a recommendation to tag the at least one element in accordance with an entity defined format. For example, the generative artificial intelligence module may be engaged to generate the at least one recommendation for tagging the at least one element. The generative artificial intelligence module may include the generative artificial intelligence module trained in accordance with the method 400 described herein. In this example, the at least one recommendation may be based on the interfaces generated in accordance with the entity defined format that were used to train the generative artificial intelligence module.

In one or more embodiments, the at least one recommendation for tagging the at least one element may include a recommendation for a particular tag that defines a trigger for executing program code of the particular tag. Put another way, the recommendation may include a recommendation for a tag that includes computer program code that executes on the interface. For example, the tag may include computer program code that may send data to a system. The tag may include a trigger that listens for certain events such as for example clicks, form submissions, page loads, etc. When an event is detected that matches the trigger definition, any tags that reference that trigger will fire.

In one or more embodiments, the recommendations may include recommendations for tags that may be required or utilized for user engagement, conversion tracking, personalized marketing, etc.

The method 500 includes sending, for display on a display screen of the computing device within the interface design software application, the at least one recommendation for tagging the at least one element (step 530).

The server computer system 120 sends the at least one recommendation to the computing device 110. The at least one recommendation is displayed on the display screen of the computing device 110 within the interface design software application. In one or more embodiments, the at least one recommendation is displayed adjacent to the at least one element on the display screen of the computing device 110. It will be appreciated that in embodiments where more than one recommendation is generated for an element, a first one of the recommendations may be displayed together with a selectable interface element that may be selected to switch or scroll through the other recommendations.

The at least one recommendation may include a selectable option to accept the recommendation. The operator may select the selectable option to accept the recommendation and in response, the computing device 110 may send an indication of acceptance of the at least one recommendation to the server computer system 120. In response, the server computer system 120 may perform operations to complete the tagging of the at least one element.

Figure 6:
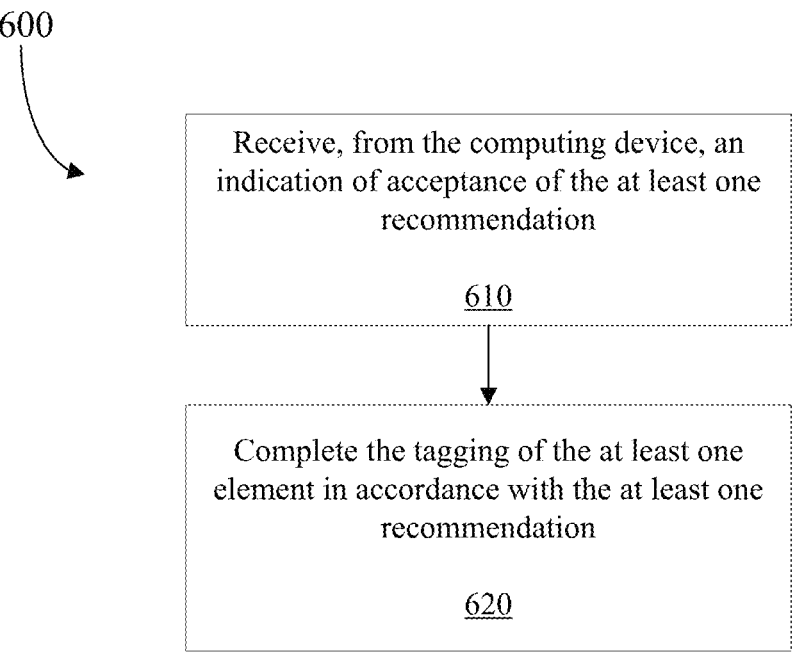
FIG. 6 is a flowchart showing operations performed by a server in completing tagging of at least one element according to an embodiment.

Reference is made to FIG. 6, which illustrates, in flowchart form, a method 600 for completing the tagging of at least one element. The method 600 may be implemented by a computing device having suitable processor-executable instructions for causing the computing device to carry out the described operations. The method 600 may be implemented, in whole or in part, by the server computer system 120.

The method 600 includes receiving, from the computing device 110, an indication of acceptance of the at least one recommendation (step 610).

As mentioned, the at least one recommendation may include a selectable option to accept the recommendation. The operator may select the selectable option to accept the recommendation and in response, the computing device 110 may send an indication of acceptance of the at least one recommendation to the server computer system 120. In response, the server computer system 120 may receive the indication of acceptance of the at least one recommendation.

The method 600 includes completing the tagging of the at least one element in accordance with the at least one recommendation (step 620).

In response to receiving the indication of acceptance of the at least one recommendation, the server computer system 120 completes the tagging. In one or more embodiments, the server computer system 120 may generate metadata associated with the at least one element in accordance with the accepted recommended tag.

In one or more embodiments, the server computer system 120 or the generative artificial intelligence module may generate a code snippet in accordance with the accepted recommended tag. The code snippet may include, for example, a JavaScript Object Notation (JSON) code snippet. The code snippet may include computer program code that executes on the interface in response to detection of a trigger. In this manner, the server computer system 120 or the generative artificial intelligence module may automatically generate the computer code snippet.

Figure 7:
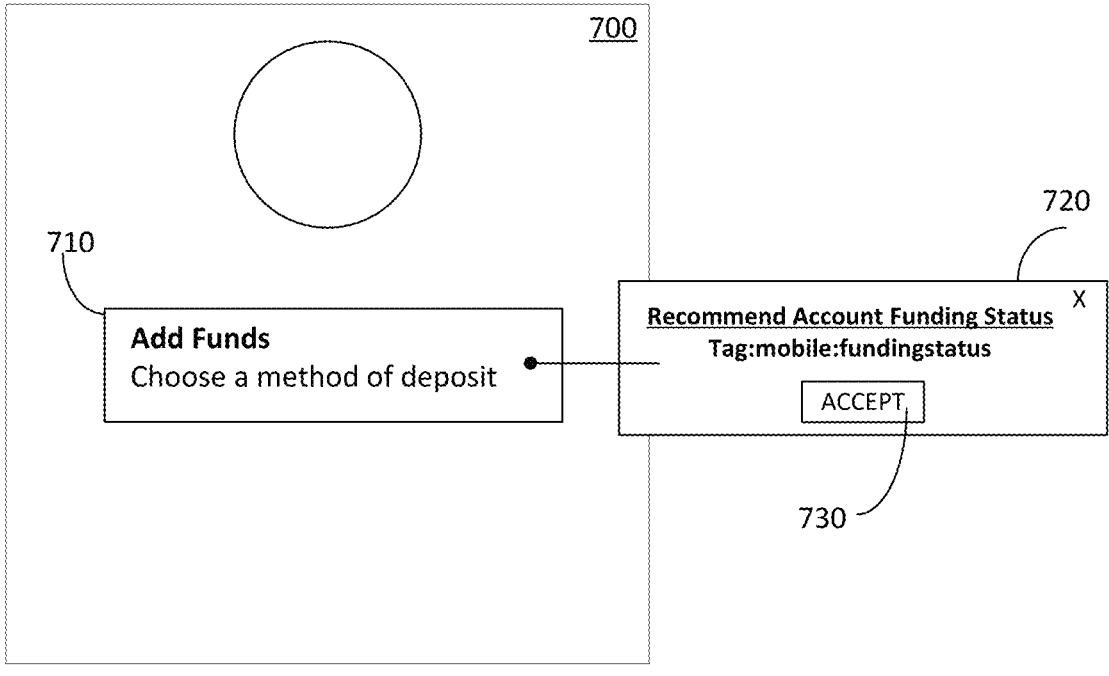
FIG. 7 is an example recommendation being displayed adjacent to an element of an interface according to an embodiment.

An example of a recommendation for tagging is shown in FIG. 7. As can be seen, an interface 700 is in the process of being designed. An element 710 is displayed on the interface 700. A recommendation 720 for tagging the element 710 is displayed adjacent to the element 710. A selectable option 730 is displayed on the recommendation 720 that, when selected, accepts the recommendation. In response to acceptance of the recommendation, the server computer system 120 may perform operations to implement the accepted tag and this may include, for example, tagging the element 710 with a tag "mobile:fundingstatus".

Figure 8:
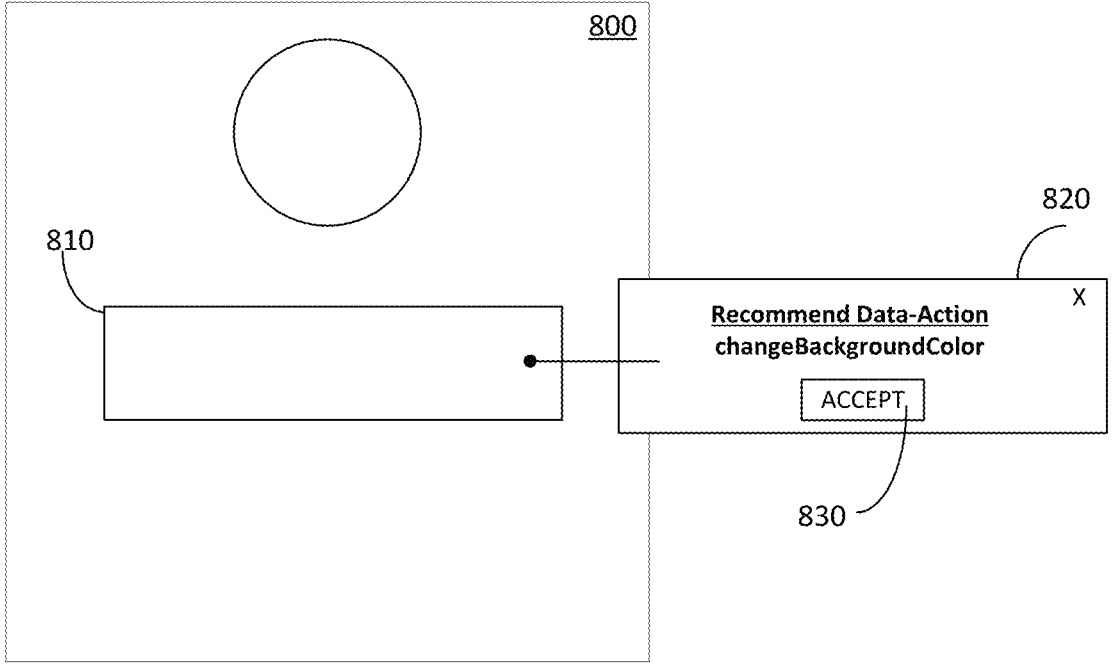
FIG. 8 is another example recommendation being displayed adjacent to an element of an interface according to an embodiment.

Another example of a recommendation for tagging is shown in FIG. 8. As can be seen, an interface 800 is in the process of being designed. An element 810 in the form of a button is displayed on the interface 800. A recommendation 820 for tagging the element 810 is displayed adjacent to the element 810. A selectable option 830 is displayed on the recommendation 820 that, when selected, accepts the recommendation. In response to acceptance of the recommendation, the server computer system 120 may perform operations to implement the accepted tag. In this example, the generative artificial intelligence module may generate a code snippet in accordance with the accepted tag. Specifically, the generative artificial intelligence module may generate a code snippet to change the background colour of the element 810 in response to detection of a trigger which in this example may include detecting a click event on the element 810.

In embodiments described herein, the at least one recommendation generated during the step 520 of the method 500 may be generated on at least one other element of the interface. For example, in one or more embodiments, a first recommendation may be generated for a first element on the interface. The first recommendation may be accepted and in response a first tag may be generated for the first element. The operator may assign a second element to the interface and in response, a second recommendation may be generated for the second element and this may be based on the tag generated for the first element. In this manner, recommendations for consistent tags may be generated for the elements of the interface and this may eliminate or reduce the risk of generating recommendations that are confusing or inconsistent with tags already assigned to elements of the interface.

Although in embodiments described herein the generative artificial intelligence module is trained to generate recommendations for tags, it will be appreciated that the generative artificial intelligence module may additionally or alternatively be trained to generate data plan recommendations. For example, the generative artificial intelligence module may be trained using a training set of data that includes interfaces that have data plans generated in accordance with an entity defined format. During the design of a new interface and through use of the plug-in, the generative artificial intelligence module may be engaged to generate recommendations for adding additional elements to the interface and this may be done to ensure consistent data plans are being utilized by the entity.

It will be appreciated that the generative artificial intelligence module may be continuously trained and retrained. For example, each time the design of an interface is completed, the interface may be stored in the database and included with updated training data. The generative artificial intelligence module may be re-trained using the updated training data. The generative artificial intelligence module may be retrained every time the design of an interface is completed or may be retrained periodically such as for example every week, month, etc. Of course, the generative artificial intelligence module may be retrained at the request of the operator. For example, the plug-in may present a selectable option within the interface design software application to retrain the generative artificial intelligence module and the operator may select the selectable option to re-train the generative artificial intelligence module.

The methods described above may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A server computer system comprising:
a communications module;
at least one processor coupled with the communications module; and
a memory coupled to the processor and storing processor-executable instructions which, when executed by the at least one processor, configure the at least one processor to:
provide a plug-in to an interface design software application executing on a computing device, the plug-in allowing the server computer system to communicate with the computing device to:
track, in real-time, operations performed within the interface design software application during creation or modification of an interface to detect addition of at least one element to the interface;
responsive to detecting the addition of the at least one element, generate at least one recommendation for tagging the at least one element; and
send, for display on a display screen of the computing device within the interface design software application, the at least one recommendation for tagging the at least one element.

2. The server computer system of claim 1, wherein the at least one recommendation for tagging the at least one element includes a recommendation to tag the at least one element in accordance with an entity defined format.

3. The server computer system of claim 1, further comprising a generative artificial intelligence module trained to generate the at least one recommendation.

4. The server computer system of claim 3, wherein the processor-executable instructions, when executed by the at least one processor, configure the at least one processor to:
obtain a set of interfaces generated in accordance with an entity defined format from a database;
create training data based at least on the set of interfaces generated in accordance with the entity defined format; and
train the generative artificial intelligence module using the training data.

5. The server computer system of claim 1, wherein the processor-executable instructions, when executed by the at least one processor, configure the at least one processor to:
receive, from the computing device, an indication of acceptance of the at least one recommendation; and
responsive to receiving the indication of the acceptance of the at least one recommendation, complete the tagging of the at least one element in accordance with the at least one recommendation.

6. The server computer system of claim 5, wherein completing the tagging of the at least one element includes generating metadata associated with the at least one element.

7. The server computer system of claim 1, wherein the at least one recommendation for tagging the at least one element is displayed adjacent to the at least one element on the display screen of the computing device.

8. The server computer system of claim 1, wherein the at least one recommendation for tagging the at least one element includes a recommendation for a particular tag that defines a trigger for executing program code of the particular tag.

9. The server computer system of claim 1, wherein the processor-executable instructions, when executed by the at least one processor, configure the at least one processor to:
identify at least one other element of the interface that includes a tag; and
generate the at least one recommendation for tagging the at least one element based on the tag of the at least one other element.

10. The server computer system of claim 1, wherein the processor-executable instructions, when executed by the at least one processor, configure the at least one processor to:
generate at least one recommendation for adding additional elements to the interface.

11. A computer-implemented method comprising:
providing a plug-in to an interface design software application executing on a computing device, the plug-in allowing a server computer system to communicate with the computing device to perform:
tracking, in real-time, operations performed within the interface design software application during creation or modification of an interface to detect addition of at least one element to the interface;
responsive to detecting the addition of the at least one element, generating at least one recommendation for tagging the at least one element; and
sending, for display on a display screen of the computing device within the interface design software application, the at least one recommendation for tagging the at least one element.

12. The computer-implemented method of claim 11, wherein the at least one recommendation for tagging the at least one element includes a recommendation to tag the at least one element in accordance with an entity defined format.

13. The computer-implemented method of claim 11, further comprising:

providing a generative artificial intelligence module trained to generate the at least one recommendation.

14. The computer-implemented method of claim 13, further comprising:

obtaining a set of interfaces generated in accordance with an entity defined format from a database;

creating training data based at least on the set of interfaces generated in accordance with the entity defined format; and training the generative artificial intelligence module using the training data.

15. The computer-implemented method of claim 11, further comprising receiving, from the computing device, an indication of acceptance of the at least one recommendation; and responsive to receiving the indication of the acceptance of the at least one recommendation, completing the tagging of the at least one element in accordance with the at least one recommendation.

16. The computer-implemented method of claim 15, wherein completing the tagging of the at least one element includes generating metadata associated with the at least one element.

17. The computer-implemented method of claim 11, wherein the at least one recommendation for tagging the at least one element is displayed adjacent to the at least one element on the display screen of the computing device.

18. The computer-implemented method of claim 11, wherein the at least one recommendation for tagging the at least one element includes a recommendation for a particular tag that defines a trigger for executing program code of the particular tag.

19. The computer-implemented method of claim 11, further comprising:

identifying at least one other element of the interface that includes a tag; and generating the at least one recommendation for tagging the at least one element based on the tag of the at least one other element.

20. A non-transitory computer readable storage medium comprising computer-executable instructions which, when executed, configure at least one processor to:

provide a plug-in to an interface design software application executing on a computing device, the plug-in allowing a server computer system to communicate with the computing device to:

track, in real-time, operations performed within the interface design software application during creation or modification of an interface to detect addition of at least one element to the interface;

responsive to detecting the addition of the at least one element, generate at least one recommendation for tagging the at least one element; and send, for display on a display screen of the computing device within the interface design software application, the at least one recommendation for tagging the at least one element.

* * * * *